(12) United States Patent
Harvey

(10) Patent No.: US 8,839,056 B2
(45) Date of Patent: *Sep. 16, 2014

(54) EQUIPMENT TESTING METHOD AND APPARATUS

(71) Applicant: James Francis Harvey, Almonte (CA)

(72) Inventor: James Francis Harvey, Almonte (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/049,161

(22) Filed: Oct. 8, 2013

(65) Prior Publication Data

US 2014/0038528 A1    Feb. 6, 2014

Related U.S. Application Data

(63) Continuation-in-part of application No. 13/506,678, filed on May 9, 2012, now Pat. No. 8,583,970.

(60) Provisional application No. 61/486,077, filed on May 13, 2011.

(51) Int. Cl.
*G01R 31/3183* (2006.01)
*H04B 17/00* (2006.01)
*H04W 24/06* (2009.01)
*G01R 31/42* (2006.01)

(52) U.S. Cl.
CPC ............ *H04W 24/06* (2013.01); *H04B 17/0062* (2013.01); *H04B 17/0085* (2013.01)
USPC .......................................... 714/712; 714/734

(58) Field of Classification Search
CPC ... H04L 43/50; H04L 12/2697; H04L 12/437; G06F 11/221; G01R 31/31716; G01R 31/31813
See application file for complete search history.

(56) References Cited

U.S. PATENT DOCUMENTS

| | | | |
|---|---|---|---|
| 5,440,636 A * | 8/1995 | Herrick | 380/34 |
| 6,603,810 B1 * | 8/2003 | Bednekoff et al. | 375/228 |
| 7,598,905 B2 | 10/2009 | Stayton et al. | |
| 8,583,970 B2 * | 11/2013 | Harvey | 714/712 |
| 2005/0257238 A1 * | 11/2005 | Hooijmans | 725/78 |
| 2007/0293180 A1 * | 12/2007 | Rahman et al. | 455/296 |
| 2008/0274726 A1 * | 11/2008 | Simola | 455/423 |

OTHER PUBLICATIONS

Dingqing, Simulation and Verification of Pulse Doppler Radar Systems, 2010, Aerospace and Defense Symposium, Agilent Technologies, pp. 1-32.*

Lu, Dingqing, "Simulation and Verification of Pulse Doppler Radar Systems", www.agilent.com, 2010 Aerospace and Defense Symposium.

(Continued)

*Primary Examiner* — Ajay Bhatia
*Assistant Examiner* — Dipakkumar Gandhi
(74) *Attorney, Agent, or Firm* — Brion Raffoul

(57) ABSTRACT

Systems, methods, and devices related to testing receive equipment. A test signal generator is coupled to both a receiver and an antenna. The receiver is also coupled to the antenna and a test signal verifier. A test signal is synthesized at the generator and is routed to the receiver. Once the verifier verifies that the test signal was received by the receiver, this ensures that the equipment coupled to the receiver, as well as the receiver itself, is in operating condition. Switches or other means of routing the test signal between the different components of the system can also be present.

17 Claims, 5 Drawing Sheets

(56) References Cited

OTHER PUBLICATIONS

Beel Technologies, "SSR Monitor, Mode 3/A, C" Example of a Test Transponder (PARROT), available for download at http://www.beeltech.com/pdf/SSRM.3A.PrimePoint.v2.24-EN.pdf, 2012.
Non-Final Rejection, U.S. Appl. No. 13/506,678, Oct. 3, 2012.
Final Rejection, U.S. Appl. No. 13/506,678, Apr. 10, 2013.
Notice of Allowance, U.S. Appl. No. 13/506,678, Jul. 9, 2013.

* cited by examiner

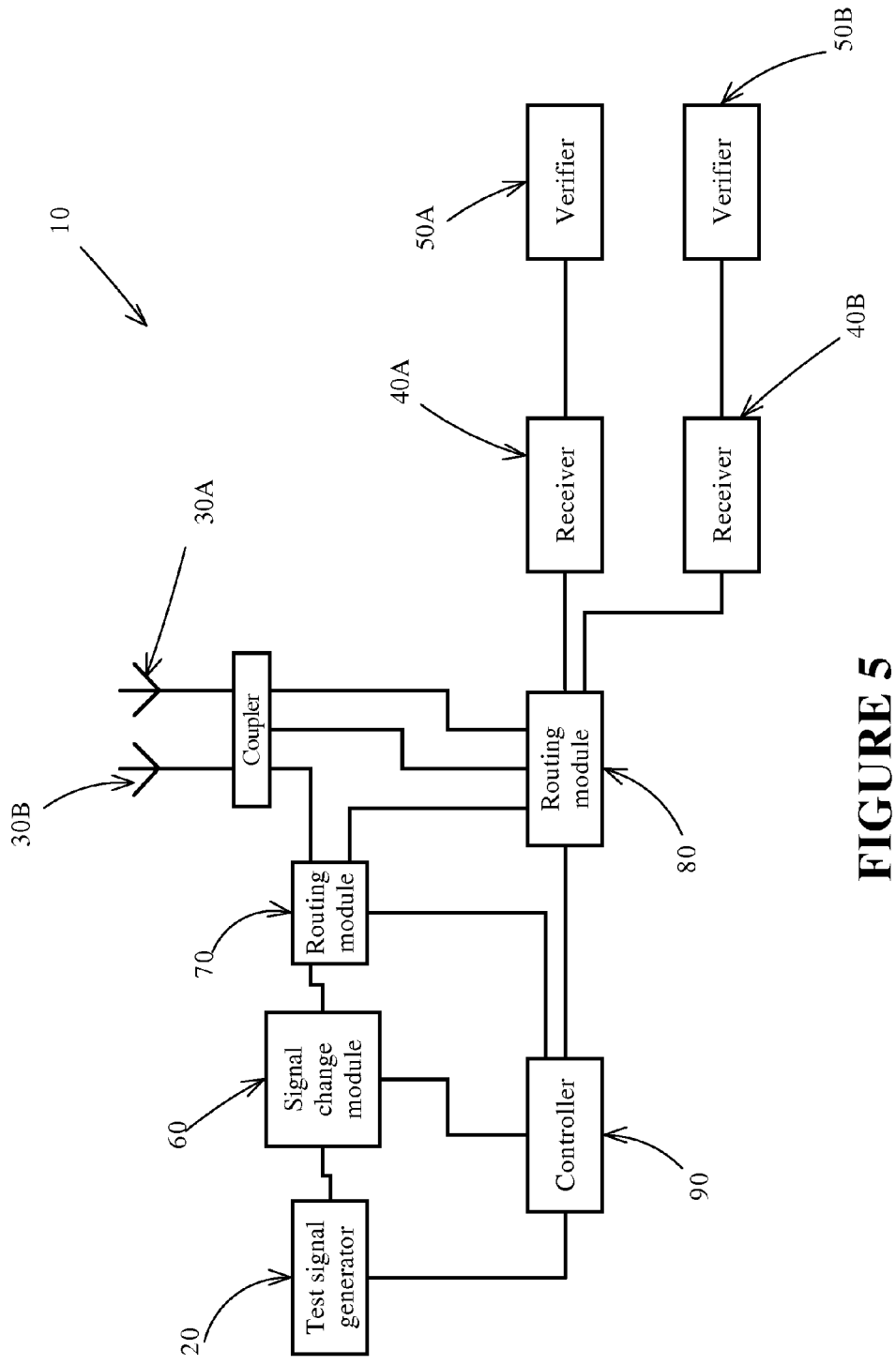

EQUIPMENT TESTING METHOD AND APPARATUS

TECHNICAL FIELD

The present invention relates to test configurations for testing radio frequency based equipment(e.g. radio/radar equipment). More specifically, the present invention relates to methods, systems, and devices for ensuring that equipment for receiving radio and other signals are in operating condition.

BACKGROUND OF THE INVENTION

Receivers used in services where the received signals are intermittent have a problem in detecting when the receiver's chain of equipment (e.g. antenna, cabling, connectors, receiver, power, etc.) has an impairment or fault.

In RADAR applications, if a response is not detected to an interrogation signal, the reason behind the lack of response remains: is it because there are no targets or is it because the receiver chain of equipment is impaired or faulty?

In two-way radio applications, if a response is not received from a called party, the question is the same: is it because the called party is not responding or is it because the receiver chain is impaired or faulty?

For one-way (receive-only) radio applications, if a signal is not received within a pre-specified period a similar question arises: is it because there is no information available or is it because the receiver chain of equipment is impaired or faulty?

In PRIMARY or AREA SURVEILLANCE RADAR, sometimes use is made of signals reflecting permanent echoes to verify the operation of the receiver chain of equipment. However, the use of such methods are only available if these permanent echoes are available and detectable within the RADAR coverage area. However, if the RADAR uses Moving Target Indication, Moving Target Detection or Doppler Processing filters, these (stationary) permanent echoes are eliminated from the received signals.

In Secondary Surveillance Radar and Automatic Dependent Surveillance-Broadcast, use is sometimes made of a test transponder, sometimes called a Position Adjustable Range Reference Orientation Transponder or PARROT. This test transponder needs to be placed at a distance from the receiver so it requires real estate and reliable power. It usually also requires reliable communications for it to be monitored by remote maintenance monitoring.

Based on the above, there is therefore a need for a solution that can be easily deployed, does not require real estate, and which can test and determined whether RF signal receiving equipment is working properly.

SUMMARY OF INVENTION

The present invention provides systems, methods, and devices related to testing receive equipment. A test signal generator is coupled to both a receiver and an antenna. The receiver is also coupled to the antenna and a test signal verifier. A test signal is synthesized at the generator and is routed to the receiver. The verifier verifies that the test signal was received by the receiver, this ensures that the equipment coupled to the receiver, and the receiver, is in operating condition. Switches or other means of routing the test signal between the different components of the system can also be present.

In a first aspect, the present invention provides a system for testing equipment coupled to at least one receiver, the system comprising:
- a test signal generator for synthesizing test signals at a predetermined interval;
- at least one antenna coupled to said generator and to one of said at least one receiver;
- at least on test signal verifier, said at least one verifier being coupled to one of said at least one receiver and being for verifying that said test signals have been received by said at least one receiver;

wherein said test signals are routed from said generator to said at least one verifier by way of one of said at least one receiver.

In a second aspect, the present invention provides a method for determining an operating condition of equipment coupled to at least one receiver, the method comprising:
a) generating test signals at predetermined intervals, said test signals being generated by a test signal generator;
b) routing said test signals to said at least one receiver by way of at least one antenna coupled to both said generator and said at least one receiver; and
c) verifying that said at least one receiver properly received said test signals.

BRIEF DESCRIPTION OF THE DRAWINGS

The embodiments of the present invention will now be described by reference to the following figures, in which identical reference numerals in different figures indicate identical elements and in which:

FIG. 5 is a block diagram of a variant of the system in FIG. 3 with multiple antennas.

DETAILED DESCRIPTION

Figure 1:
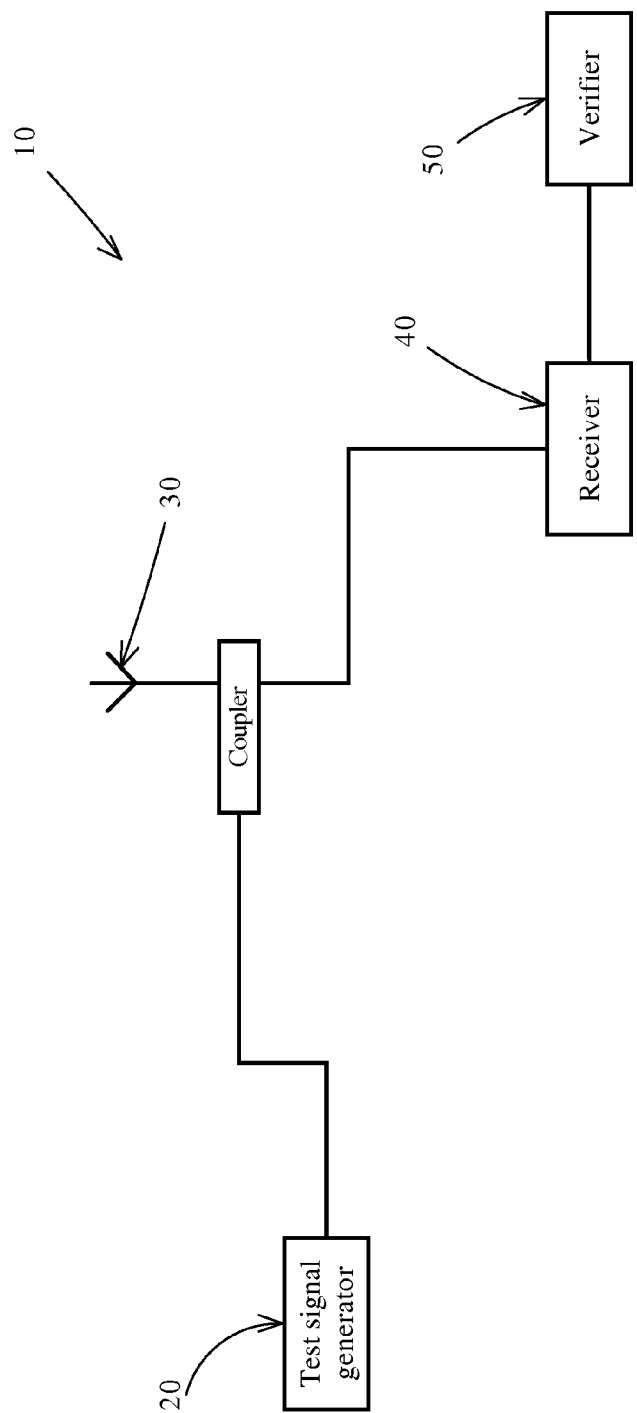
FIG. 1 is a block diagram of a system according to one aspect of the invention.

Referring to FIG. 1, a system 10 according to one aspect of the invention is illustrated. The system 10 has a test signal generator 20 which is coupled to an antenna 30. The antenna 30 is, in turn, coupled to a receiver 40. The receiver 40 is coupled to or in communication with a verifier 50 or verifier means 50.

In one implementation, the system 10 illustrated in

FIG. 1 operates with RF or radio frequency signals. The system may be optimally used in situations where the RF signals being received are intermittent or where coverage or reception of the RF signals are not optimum or is spotty. As such, the system may be used in applications dealing with radar signals, two-way radio, receive-only radios, cellular wireless, WiFi, satellite phones, satellite-based data transmissions, and GPS (Global Positioning System) signals.

The system operates with the test signal generator 20 generating or synthesizing at least one test signal. The test signal is then routed to the antenna 30 and then to the receiver 40. Once received by the receiver 40, the test signal is verified as being properly received by the verifier 50.

The test signal generator 20 may take the form of any suitable signal synthesizer that produces a test signal suitable for the receiver. As can be imagined, depending on the signal that the receiver is expecting, the test signal to be synthesized might be of different types. In one implementation, the test signal generator regularly generates a test signal at pre-determined intervals.

The receiver may be any receiver which can receive radio frequency signals from the antenna or any other elements of the system. Preferably, the receiver is one which is used in applications involving intermittent signals. In one embodiment, the test signal is injected, at pre-determined interval or intervals (i.e. the interval can be fixed or adjustable) into the front end of the receiver in applications using intermittent signals.

The verifier can be any suitable means for verifying the test signals. This could be a human based means (e.g. in a radio application, the test signal is heard by the operator, in a RADAR application, the test signal is seen as a target) or an electronic means of verification.

Figure 2:
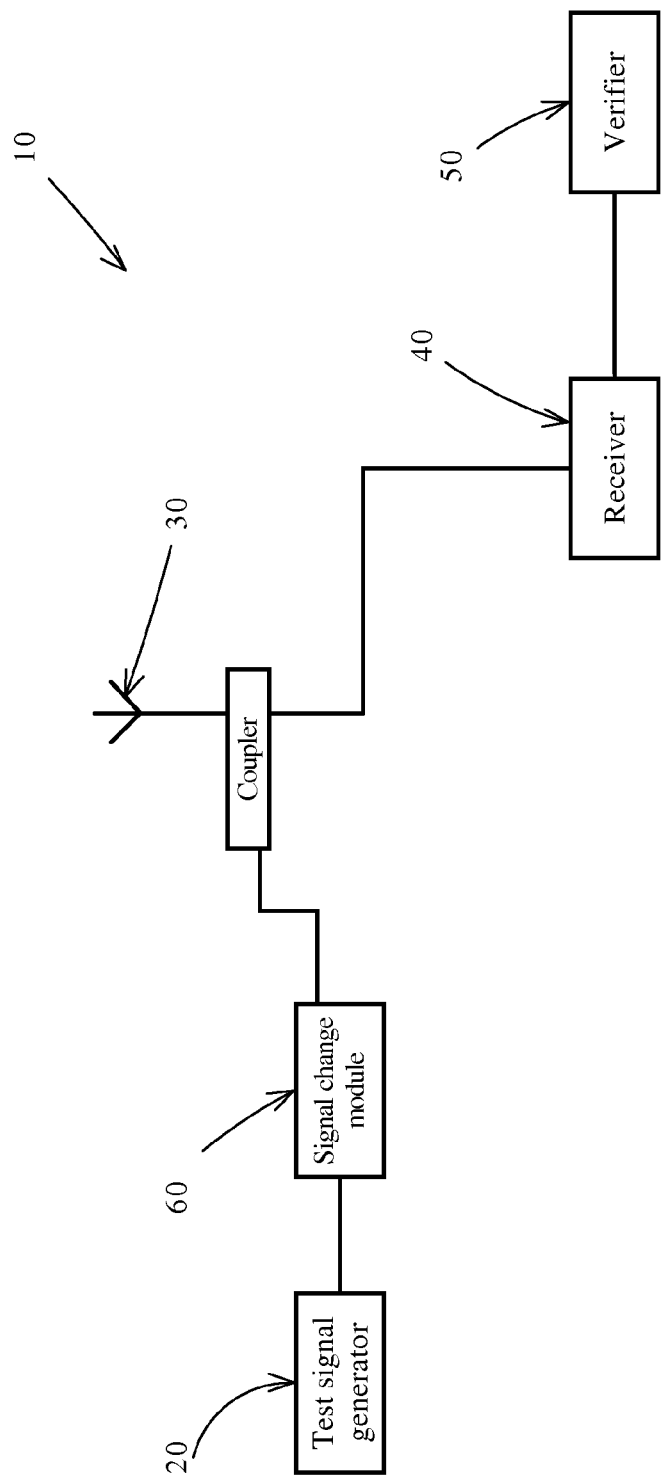
FIG. 2 is a block diagram of a variant of the system in FIG. 1.

Referring to FIG. 2, a variant of the invention shown in FIG. 1 is illustrated. As can be seen in FIG. 2, a signal change module 60 is coupled between the antenna 30 and the test signal generator 20. The signal change module 60 can adjust at least one characteristic of the test signal. The characteristic which can be changed can be any of amplitude, phase, modulation depth, polarity, range, azimuth or signal frequency of the test signal. As can be imagined any one of these characteristics or any combination of these characteristics can be adjusted. In one implementation, the characteristic or characteristics can be adjusted to a specific value. In another implementation, the characteristic or characteristics can be swept across a range of values. As an example, a test signal can be of a specific amplitude or the test signal can have its amplitude swept from a predetermined starting value to a predetermined ending value.

It should be noted that when the signal change module is present in the system, the verifier 50 is adjusted or informed of the changes to the test signal. This ensures that the test signal can be properly verified by the verifier or verifier means as being received by the receiver.

Figure 3:
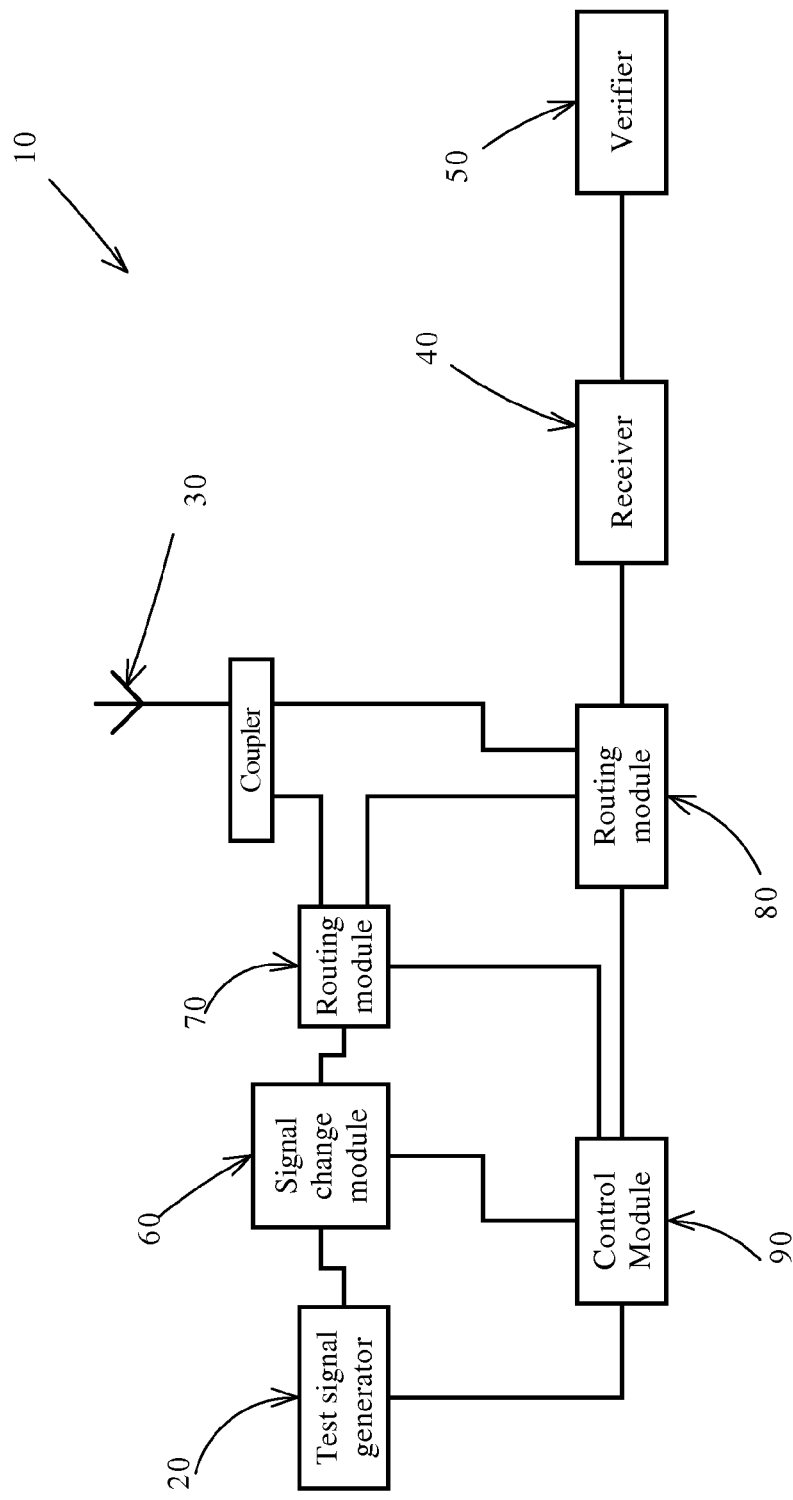
FIG. 3 is a block diagram of a further variant of the system in FIGS. 1 and 2.

Referring to FIG. 3, another variant of the system is illustrated. As can be seen, switch or routing modules 70, 80 are present. Routing module 70 is placed between the signal change module 60 and the antenna 30. Routing module 80 is placed between the antenna 30 and the receiver 40 but is also coupled to the routing module 70. A control module 90 is coupled to both routing modules 70, 80, and the test signal generator 20. The routing module 70 routes the test signal from the signal change module 60 to either the antenna 30 or to the routing module 80. The routing module 80 routes a signal from the routing module 70 to the receiver 40 or from the antenna 30 to the receiver 40.

The use of routing modules 70, 80 allows for both "internal" and "external" routing of the test signal to test different parts of the system. This allows for faults and impairments to be isolated to either internal or external components. Once isolated, the faults or impairments can be rapidly corrected. For an internal test, the test signal is routed from the test signal generator 20 to the signal change module 60 to the routing module 70 then to the routing module 80 and finally the receiver 40. This routing routes the test signal to the internal wiring and components of the system. For an external routing, the test signal is routed from the test signal generator 20 to the signal change module 60 to the routing module 70 then to the antenna 30 and then to routing module 80 and finally the receiver 40. The external routing routes the signal to the wiring and circuitry coupled to the antenna 30.

It should be noted that the routing modules 70, 80 can be any suitable device or component which is capable of switching or routing signals between at least two potential signal paths. Such routing modules are known to those skilled in the art.

For a better understanding of the invention, it should be noted that the control module 90 can control the routing of the test signal by controlling the behaviour and operation of the routing modules 70, 80 as well as the operation of the signal change module 60. Based on the control signals produced by the controller 90, the routing modules 70, 80 can route the signal accordingly.

In the event the system is used in applications involving Moving Target Indication, Moving Target Detection, and/or Doppler Processing RADAR Applications, filters can be incorporated into the system's receiver chain of equipment. By changing the characteristics of the test signal by way of the signal change module, Moving Target Indication, Moving Target Detection and Doppler Processing filters can be defeated.

It should be noted that the system described above and the methods involved in the invention can be used if the use for the system is receive only, transmit and receive using individual dedicated antennas for transmit and receive, or transmit and receive using a shared antenna. Various configurations for the antenna and the receiver are also possible and can be used with the system. As examples, the antenna may be dedicated to the receiver, a dedicated antenna may be used by a transmitter, and the transmitter and receiver may share an antenna.

The test signal and the consequences of its use can be varied. On its own, the test signal can be used to provide a GO/NO GO Operation/Fault indication. With variation of the test signal by the signal change module over the pre-specified ranges of the receiver, the performance of the receiver chain of equipment (i.e. the components coupled to the receiver as well as the receiver itself) can be determined.

It should be noted that once the test signal is transmitted to the receiver, regardless of the configuration, the verifier can determine if the receiver has received the test signal. In the event the test signal (or signals) are not received by the receiver, then it can be concluded that there is a fault or problem with the components on the signal path between the test signal generator and the receiver.

In another embodiment of the invention, the test signal can be automatically synthesized and routed to the receiver under control of the controller. If the receiver does not receive the test signal after a predetermined amount of time, with the verifier verifying that the receiver has or has not received the test signal, a fault in the system can be declared.

For greater applicability of the invention, the system can test its components under operational conditions. As such, the various methods and systems described and discussed above can be used even while the system is being used for various practical applications.

Accordingly, it can be seen that the invention and its variants can provide a speedy and effective method and system for detecting and isolating impairments and faults which can lead to their speedy correction. The invention is eminently applicable to applications which use intermittent signals. Some of these applications (e.g. RADAR, Automatic Dependent Surveillance-Broadcast, GPS, etc.) can be mission-critical and flight-safety related.

The system described above and the concepts explained can also be extended to other applications. Two specific applications which can use the invention are amplitude-comparison monopulse direction finding and the phase-comparison monopulse technique (also known as phase-interferometry). These two applications use at least two antennas with corresponding receivers. Both techniques require that the direction of incoming signals be determined relative to a boresight, a specific baseline direction. Unfortunately, due to temperature changes, aging equipment, errors in calibration, etc., equipment used in these techniques may not be properly calibrated to the boresight or may even be malfunctioning. The concepts described above can be extended so that they are applicable to systems used in these applications.

Figure 4:
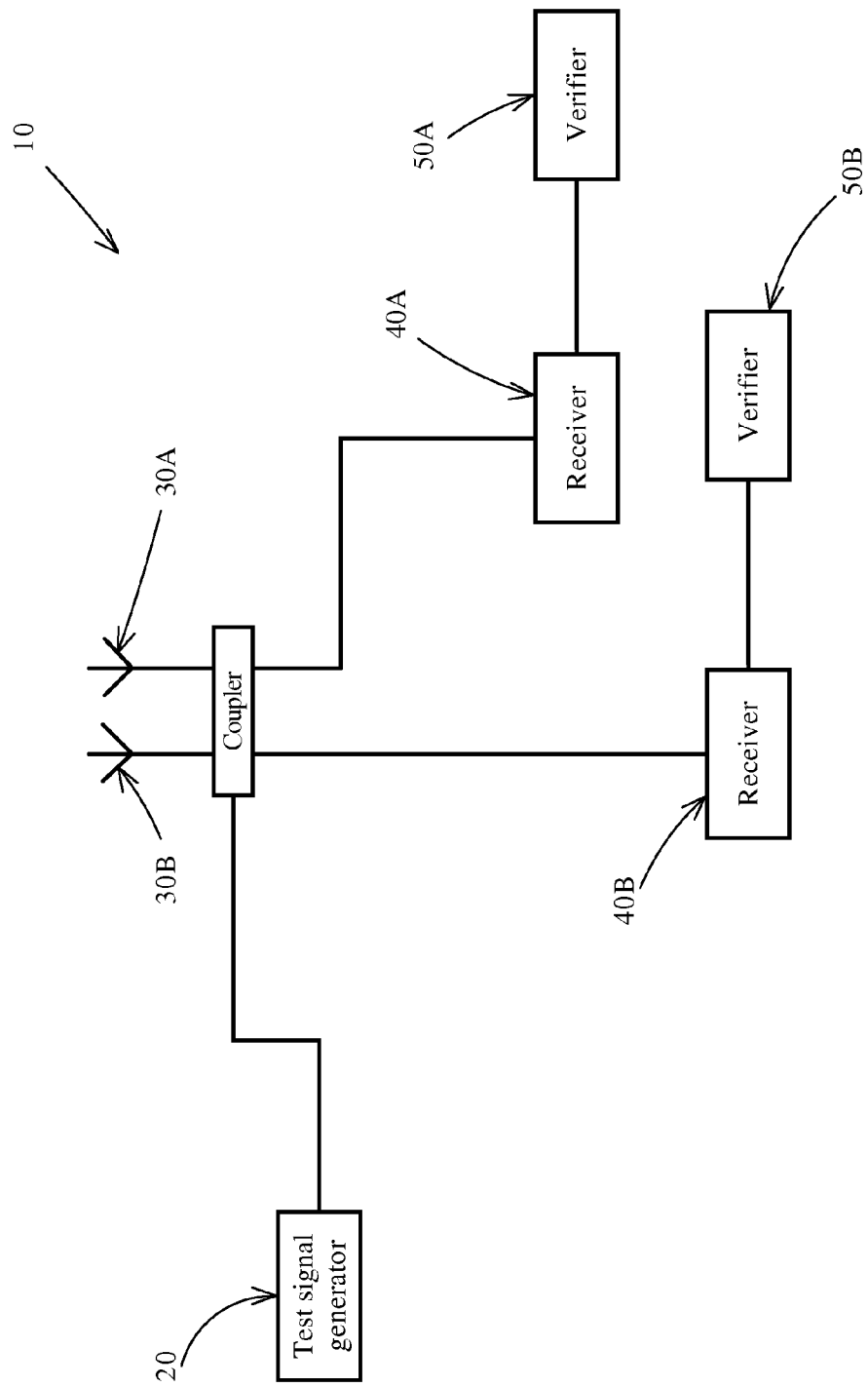
FIG. 4 is a block diagram of a variant of the system of FIG. 1 with multiple antennas.

Referring to FIG. 4, a block diagram of a variant of the system in FIG. 1 is illustrated. As can be seen, FIG. 4 differs from FIG. 1 in that two antennas 30A and 30B are present along with two receivers 40A, 40B and two verifiers 50A, 50B. The test signal generator synthesizes a test signal which will have a known effect on the receivers 40A, 40B. As an example, a test signal can be sent which should propagate at the specific boresight direction. This test signal should therefore be received at the two receivers with no deviation from boresight (i.e. the direction of the signal received by both receivers 40A, 40B should correspond to the boresight direction). In the event the received signals indicate a direction other than that of the boresight direction, then either the receiver or the circuitry coupled to the receiver is faulty or malfunctioning.

The system illustrated in FIG. 4 can be extended to include routing modules which allow for both internal and external routing of test signals. Such an extended system is illustrated in FIG. 5. FIG. 5 differs from FIG. 3 in that two antennas 30A, 30B are present along with two receivers 40A, 40B. Also present are verifiers 50A, 50B. Operation of the system in FIG. 5 is similar to the operation of the system in FIG. 3 with the exception that the test signal is sent to both antennas 30A, 30B and is received and verified by receivers 40A, 40B and verifiers 50A, 50B. The routing module 70 can route the test signal to both the antennas 30A, 30B or to the routing module 80. The routing module 80 can determine which signals to route to the receivers 40A, 40B. These signals can be either from the antennas 30A, 30B or from the routing module 70. Much like the system in FIG. 4, the test signal is routed to the receivers 40A, 40B and if the received signal is off from the boresight direction, then a fault or error is determined.

It should be noted that various methods are available to adjust for the fault or error. If the off-boresight reading is minimal or within reasonable limits, the error can be accounted for in software (e.g. if the reading is off by a few degrees, then any readings can be compensated for by those few degrees). Alternatively, the equipment can be replaced to ensure proper readings.

It should be noted that while the embodiments illustrated and explained in relation to FIGS. 4 and 5 only show two antennas, systems using more than two antennas are possible. For such systems, each antenna can be paired with a corresponding receiver and verifier. Thus, each antenna-receiver pair would have its own verifier which can verify that the test signal received by the receiver is at boresight or not.

A person understanding this invention may now conceive of alternative structures and embodiments or variations of the above all of which are intended to fall within the scope of the invention as defined in the claims that follow.

I claim:

1. A system for testing equipment coupled to at least one receiver, the system comprising:
   a test signal generator for synthesizing test signals at a predetermined interval;
   at least one antenna coupled to said generator and to said least one receiver;
   at least one automatic test signal verifier, said verifier being coupled to one of said at least one receiver and being for verifying that said test signals have been received by said at least one receiver;
   at least one filter for at least one of:
      Doppler Processing;
      Moving Target Detection;
      Moving Target Indication;
   wherein
   said test signals are routed from said generator to said at least one verifier by way of said at least one receiver; and
   said test signals are configured to defeat said at least one filter.

2. The system according to claim 1 wherein said at least one receiver is for receiving intermittent signals.

3. The system according to claim 1 further including a signal change module coupled between said antenna and said generator, said signal change module being for adjusting said test signal according to predetermined limits.

4. The system according to claim 3 wherein said signal change module adjusts at least one characteristic of said test signal across a predetermined range of said at least one characteristic.

5. The system according to claim 4 wherein said at least one characteristic is at least one of:
   amplitude;
   phase;
   modulation depth;
   polarity;
   range;
   azimuth; and
   frequency.

6. The system according to claim 1 further including at least one switch module for routing said test signals to said at least one receiver.

7. The system according to claim 6 further including at least one first switch module coupled between said generator and said at least one antenna, said at least one first switch module being for routing said test signal to either said at least one antenna or said at least one receiver.

8. The system according to claim 7 further including at least one second switch module coupled between said at least one antenna and said at least one receiver, said at least one second switch module being for coupling said at least one receiver to either said at least one antenna or said at least one first switch module.

9. The system according to claim 6 further including at least one control module for controlling said at least one switch module.

10. The system according to claim 9 wherein said at least one control module controls said generator.

11. A method for determining an operating condition of equipment coupled to at least one receiver, the method comprising:
   a) generating test signals at predetermined intervals, said test signals being generated by a test signal generator;
   b) routing said test signals to said at least one receiver by way of at least one antenna coupled to both said generator and said at least one receiver; and
   c) verifying that said at least one receiver received said test signals;
   d) adjusting at least one characteristic of said test signals across a predetermined range;
   wherein
   said step of adjusting at least one characteristic is for defeating at least one filter coupled between said generator and said at least one receiver.

12. The method according to claim 11 wherein said at least one characteristic is at least one of:
   amplitude;
   phase;
   modulation depth;
   polarity;
   range;
   azimuth; and
   frequency.

13. The method according to claim 11 wherein step b) comprises:
   setting at least one routing switch to route said test signals from said generator to said at least one receiver.

14. The method according to claim 13 wherein said at least one routing switch is controlled by a controller module.

15. The method according to claim 11 wherein said at least one filter is for at least one of:
   Doppler Processing;
   Moving Target Detection; and
   Moving Target Indication.

16. The method according to claim 11 wherein said method is used in one of:
   amplitude-comparison monopulse direction finding; or
   phase-comparison monopulse direction finding.

17. The method according to claim 11 wherein said method is used in one of:
   amplitude-comparison monopulse direction finding; or
   phase-comparison monopulse direction finding.

* * * * *